United States Patent
Sowers

(10) Patent No.: US 9,326,599 B1
(45) Date of Patent: May 3, 2016

(54) CABINET STORAGE UNIT WITH ROTATING CAROUSEL SHELF SYSTEM

(71) Applicant: George F. Sowers, Winston Salem, NC (US)

(72) Inventor: George F. Sowers, Winston Salem, NC (US)

(73) Assignee: Zack Racks, LLC, Winston Salem, NC (US)

( * ) Notice: Subject to any disclaimer, the term of this patent is extended or adjusted under 35 U.S.C. 154(b) by 0 days.

(21) Appl. No.: 14/640,467

(22) Filed: Mar. 6, 2015

(51) Int. Cl.
  *A47B 46/00* (2006.01)
  *B65G 1/127* (2006.01)
  *A47F 5/03* (2006.01)
  *A47F 5/025* (2006.01)

(52) U.S. Cl.
  CPC ............... *A47B 46/005* (2013.01); *A47F 5/025* (2013.01); *A47F 5/03* (2013.01); *B65G 1/127* (2013.01)

(58) Field of Classification Search
  CPC ...... B65G 1/127; A47B 46/005; A47F 5/025; A47F 5/03
  USPC .......... 414/267, 754, 779, 780, 782; 211/121, 211/1.56; 312/97, 212, 266, 267, 268
  See application file for complete search history.

(56) References Cited

U.S. PATENT DOCUMENTS

| | | | |
|---|---|---|---|
| 1,680,035 A | 8/1928 | Buckingham | |
| 2,442,070 A | 5/1948 | Bouchard | 211/114 |
| 2,603,547 A * | 7/1952 | Zook | A47B 63/067 211/121 |
| 2,703,643 A | 3/1955 | Parsons | 198/137 |
| 3,298,536 A | 1/1967 | Zippel | 211/121 |
| 3,299,658 A | 1/1967 | Kramer | 62/263 |
| 4,017,132 A * | 4/1977 | Banys | B65B 1/127 312/268 |
| 4,314,647 A | 2/1982 | Harris et al. | 211/121 |
| 6,119,880 A | 9/2000 | Dueck | 211/121 |
| 6,854,815 B1 | 2/2005 | Smith | 312/268 |
| 7,635,246 B2 | 12/2009 | Neeper et al. | 414/280 |
| 7,743,930 B2 | 6/2010 | Krohn | 211/1.51 |

* cited by examiner

*Primary Examiner* — Michael Safavi
(74) *Attorney, Agent, or Firm* — Blake P. Hurt; Tuggle Duggins P.A.

(57) ABSTRACT

A chain-driven rotating shelf carousel formed by a plurality of pivoting shelves rotating within a continuous track disposed vertically within an upright cabinet storage unit is provided. Each shelf is attached to a chassis with leading and trailing arms terminating in cams positioned in the track which are driven by a series of sprockets. The shelves include engagement channels that enclose corresponding projections when the shelf moves into an access position generally aligned with an exterior door, such that when the exterior door is opened, the shelf can be accessed by a user.

20 Claims, 10 Drawing Sheets

CABINET STORAGE UNIT WITH ROTATING CAROUSEL SHELF SYSTEM

FIELD OF THE INVENTION

The invention herein pertains to storage units and particularly pertains to a motorized cabinet carousel with a plurality of shelves accessible by the elderly or infirm.

DESCRIPTION OF THE PRIOR ART AND OBJECTIVES OF THE INVENTION

Storing a large supply of goods is a constant logistical challenge for commercial and residential storage. Depending on the type of storage and the products being stored, the spatial requirements for a sufficient storage solution can be very great. Whether it be commercial displays in a retail space or pantry storage in the home, conventional shelves often result in inefficient use of floor and cabinet space because they limit the useable height of the storage to that which the user can easily and safely reach. Storage above or behind this arbitrary demarcation is either not utilized, accessed with additional personnel or with the use of a ladder, or inefficiently used. Conventional shelves are also not very accommodating, either for the vertically challenged, those in wheelchairs and mobile carts, the elderly, the infirm, the disabled, and so on. Further, numerous economic studies have shown the value of presenting merchandise at certain vertical (i.e. head level compared to lower to the floor) and lateral (i.e. front compared to further back) levels to increase commercial activity, which necessitates employees physically moving the products on the shelves.

Shelves configured for vertical carousel rotation present the potential to use the space above conventional fixed-position shelves for storing merchandise that can be brought to all consumers in addition to other products in the residential environment. A variety of carousel shelving units are known and have been used in a variety of settings for various purposes. For example, Zook, U.S. Pat. No. 2,603,547; Bouchard, U.S. Pat. No. 2,442,070; Buckingham, U.S. Pat. No. 1,680,035; Harris et al., U.S. Pat. No. 4,314,647; Parsons, U.S. Pat. No. 2,703,643; Graber et al.; U.S. Pat. No. 3,299,658; Zippel, U.S. Pat. No. 3,298,536; Smith, U.S. Pat. No. 6,854,815; and Dueck, U.S. Pat. No. 6,119,880 all disclose vertical carousel shelving units of different configurations, some of which are intended to display merchandise in retail stores. However, none of these carousel shelving units have gained widespread acceptance in the retail industry or residential application. To date, no efficient or effective carousel shelving unit is available or in wide spread use in retail stores or homes, and no current carousel shelving unit addresses the need to employ a stock person to maintain merchandise on the shelves in an organized manner or deploy, or a nurse or other assistant in the case of a wheelchair-bound user.

Thus, in view of the problems and disadvantages associated with prior art devices, the present invention was conceived and one of its objectives is to provide a cabinet with vertically rotating shelves.

It is another objective of the present invention to provide an automated shelf rack with an electronic controller display for the efficient storage of food and other kitchen products.

It is still another objective of the present invention to provide a motor-driven shelf carousel controlled with an electronic display.

It is yet another objective of the present invention to provide a refrigerated cabinet with vertically rotating shelves.

It is a further objective of the present invention to provide a cabinet with vertically rotating shelves and an access door configured for use by people confined to a wheelchair.

It is still a further objective of the present invention to provide a cabinet carousel with an outer door affixed to a catch door with a linkage.

It is yet a further objective of the present invention to provide a padded door attached to a motor-driven shelf carousel.

It is another objective of the present invention to provide a cabinet carousel including a door with an adjustable opening.

It is still another objective of the present invention to provide a cabinet containing rotatable shelves with an angled light source and a nylon brush mounted therein.

It is yet a further objective of the present invention to provide a cabinet carousel containing rotatable shelves with a stop plate, a guide plate, and a threaded bumper mounted therein.

Various other objectives and advantages of the present invention will become apparent to those skilled in the art as a more detailed description is set forth below.

SUMMARY OF THE INVENTION

The aforesaid and other objectives are realized by providing a cabinet system including a chain-driven rotating shelf carousel formed by a plurality of pivoting shelves rotating within a continuous track disposed vertically within an upright cabinet storage unit. Two track systems are opposingly positioned at either lateral side of the cabinet, generally defining a carousel path for the shelves. Each track system forms a midline channel which bifurcates into inner and outer track segments proximate the cabinet top and bottom. The track systems are respectively configured to operatively engage one or more displacement members attached to the shelves as the shelves maintain a horizontal posture throughout rotation. A roller chain in communication with the displacement members is frictionally engaged with one or more sprockets, driving the rotation of the shelf carousel with a two-way variable speed drive unit controlled by an electronic controller with a digital display. The door assembly of the cabinet includes a cabinet door, a catch door, and a shelf door that respectively pivot manually to open and close as desired by a user, permitting access within the cabinet and securing items stored in the shelf carousel when not in use.

An alternate embodiment of the chain-driven shelf carousel described above includes fewer shelves, for example eight (8) instead of ten (10), and includes a refrigeration compressor capable of cooling the interior of the storage unit. In order to maintain a refrigerated environment within the cabinet, this embodiment further includes insulating material positioned laterally and longitudinally along the cabinet-facing surfaces of the cabinet door to form a thermal seal and prevent the access of warmer air therein.

DETAILED DESCRIPTION OF THE PREFERRED EMBODIMENT AND OPERATION OF THE INVENTION

Figure 1:
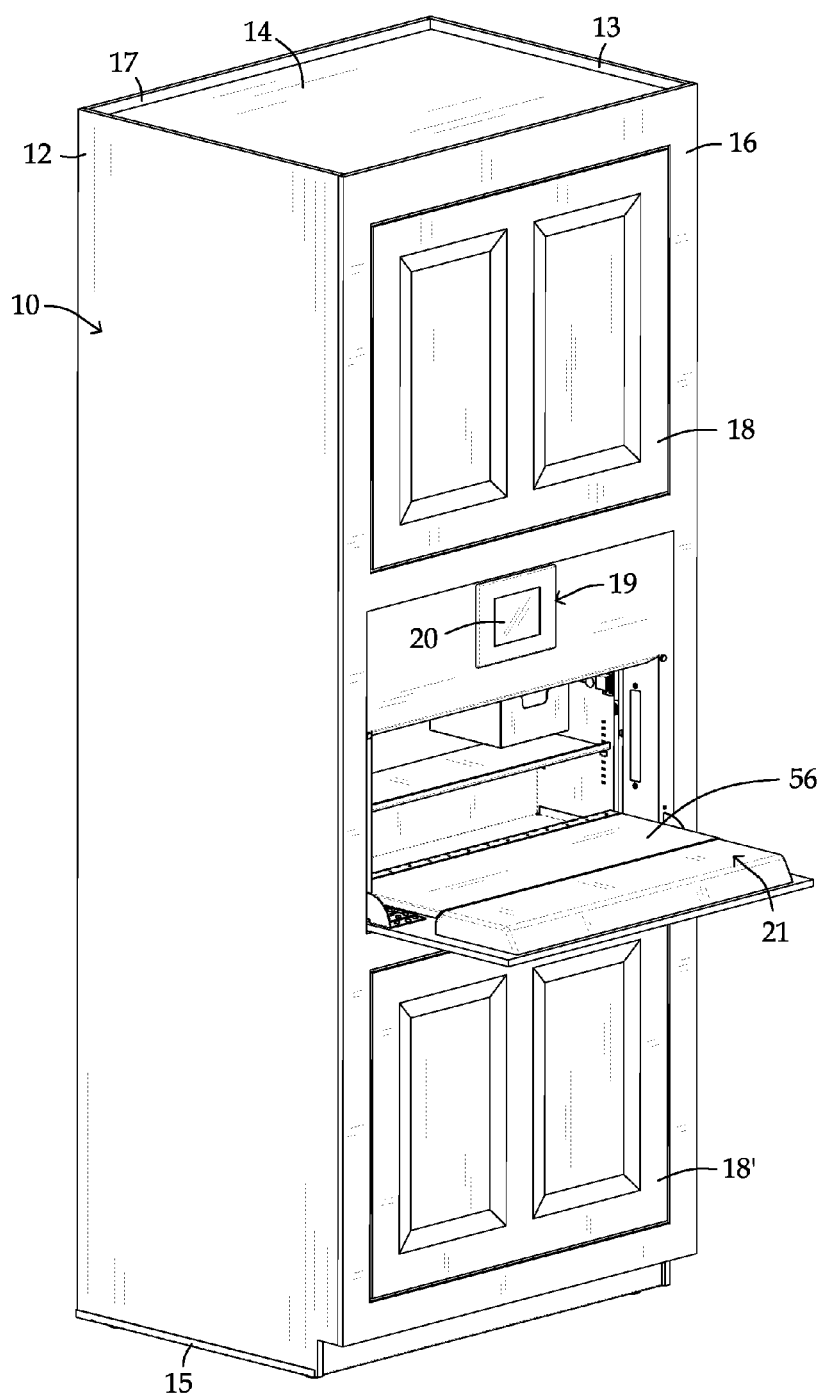
FIG. 1 shows a front perspective view of a shelf carousel within a storage unit.

For a better understanding of the invention and its operation, turning now to the drawings, FIG. 1 illustrates storage unit 10 that is configured and oriented to contain shelf carousel system 11 therein. Storage unit 10 preferably serves as the support frame and attachment structure for shelf carousel system 11, as will be discussed in further detail below. Storage unit 10 is represented in FIG. 1 as defining an exterior similar to that of an interior, residential cabinet installation formed out of wood or the like but it should be understood that storage unit 10 may define numerous different embodiments, including various sizes, shapes, and materials, in order to accommodate the specific wishes of the user in a given operating environment. For example, storage unit 10 generally includes planar vertical side wall members 12 and 13, perpendicular top section 14, and bottom portion 15 attached as would be understood to front and rear vertical faces 16 and 17, respectively. An embodiment of storage unit 10 may further include upper aesthetic component 18 and lower aesthetic component 18' defined in front face 16, respectively above and below control display 19, to blend into the overall design of a room, for example a kitchen, pantry, dining room, or the like. It is intended that storage unit 10 will form an enclosed structure, but certain embodiments may have one or more openings, for example to service shelf carousel system 11, cleaning operations, providing handholds to move storage unit 10, and so on. Storage unit 10 is illustrated as a "stand alone" structure, in that it requires no additional support to be structurally sound, but it should be understood that storage unit 10 may be affixed to one or more additional units (not shown) or mounted as a component of an overall room design, much like the positioning of a refrigerator or oven in a finished kitchen.

Storage unit 10 also serves as a housing for external control display 19 which preferably includes pressure-sensitive screen 20 and is configured to electronically control the operation of shelf carousel system 11 as will be described in further detail below. While the dimensions of storage unit 10 should not limit the scope of the instant invention, the height of storage unit 10, and therefore the corresponding size of shelf carousel system 11, is preferably at least ninety inches (90"), and more preferably at least ninety-six inches (96") approximately eight feet (8') to provide sufficient storage space for various items within storage unit 10. Further, while an embodiment of storage unit 10 may be utilized in a residential setting, a larger and taller embodiment of storage unit 10 (not shown) may be deployed in commercial or industrial settings, for example warehouses or other high-ceiling structures whereby storage unit 10 would define a significantly greater height, for example at least two hundred inches (200") and preferably two hundred sixteen inches (216") approximately eighteen feet (18'). Regardless of the overall height of storage unit 10, it is desirable to position control display 19 in close proximity to door module 21 which is positioned approximately thirty inches (30") from the bottom of storage unit 10, ideally oriented to be engaged by a user from the seated position, for example a wheelchair or the like. A representation of the preferred position and orientation of display 19 positioned above door module 21 is displayed in the front elevated view presented in FIG. 2.

Figure 2:
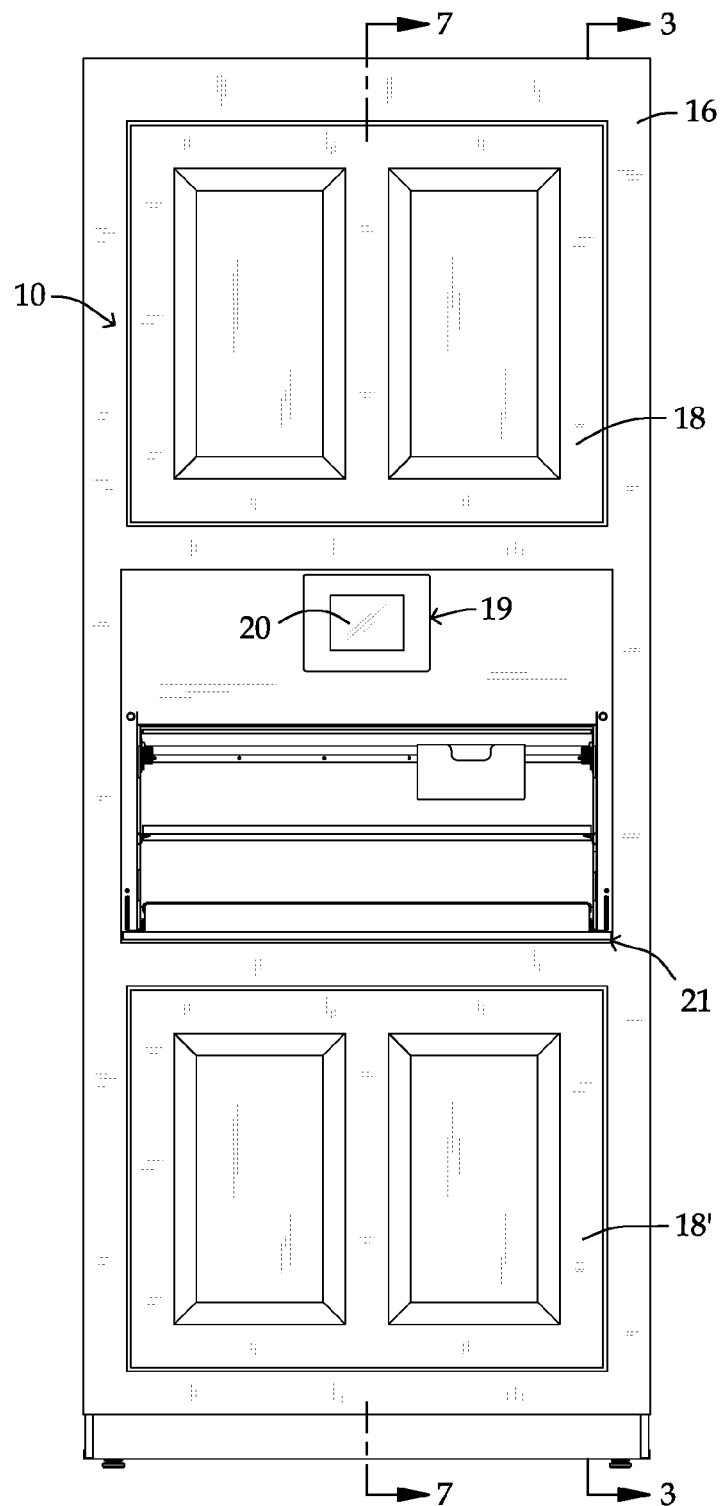
FIG. 2 demonstrates an elevated front plan view of the storage unit of FIG. 1.
Figure 3:
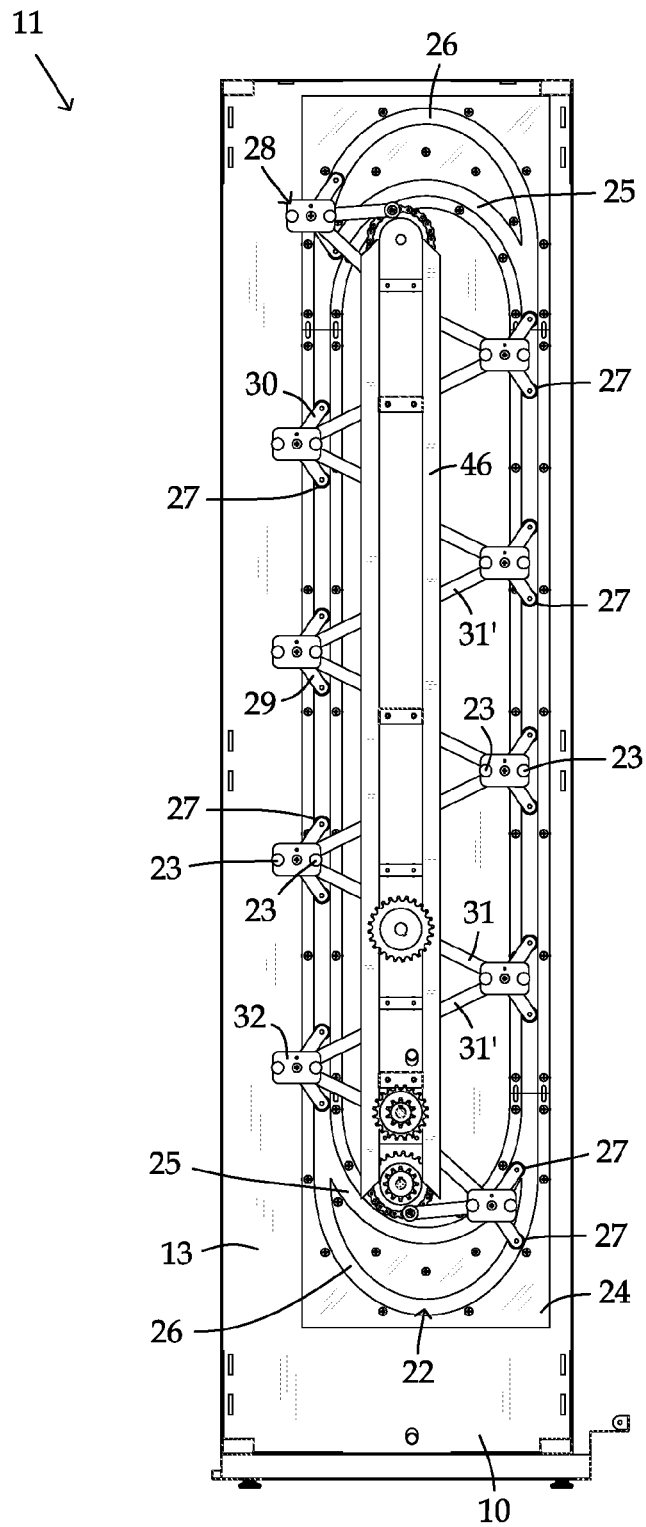
FIG. 3 illustrates an elevated side cross-sectional view of the carousel of FIG. 2 along lines 3-3.

FIG. 3 illustrates an elevated lateral side cross-sectional view within storage unit 10 of FIG. 2 along lines 3-3, displaying one side or half of shelf carousel system 11 without the shelves. Shelf carousel system 11 is formed from a pair of support tracks 22 attached longitudinally to the respective side walls of storage unit 10, for example with threaded fasteners (not shown) anchored to interior metallic cladding 24 via associated apertures. For the sake of clarity and brevity, one support track 22 is described herein but it should be understood that the following description applies to the laterally opposing support track 22 and associated components equally as mirror images. Support track 22 is preferably a U-shaped displacement channel which defines a guide oriented to receive a displacement member such as cam wheels 27 therein, although other displacement members such as frictional shoe pads or the like are also contemplated. Preferred support track 22 bifurcates at opposing longitudinal ends into inner and outer arcuate routes 25 and 26, respectively. Although the shape of inner displacement route 25 and outer displacement route 26 may define a variety of shapes, the preferred orientation is semi-circular, with outer displacement route 26 having a greater circumference than inner displacement route 25.

Figure 4:
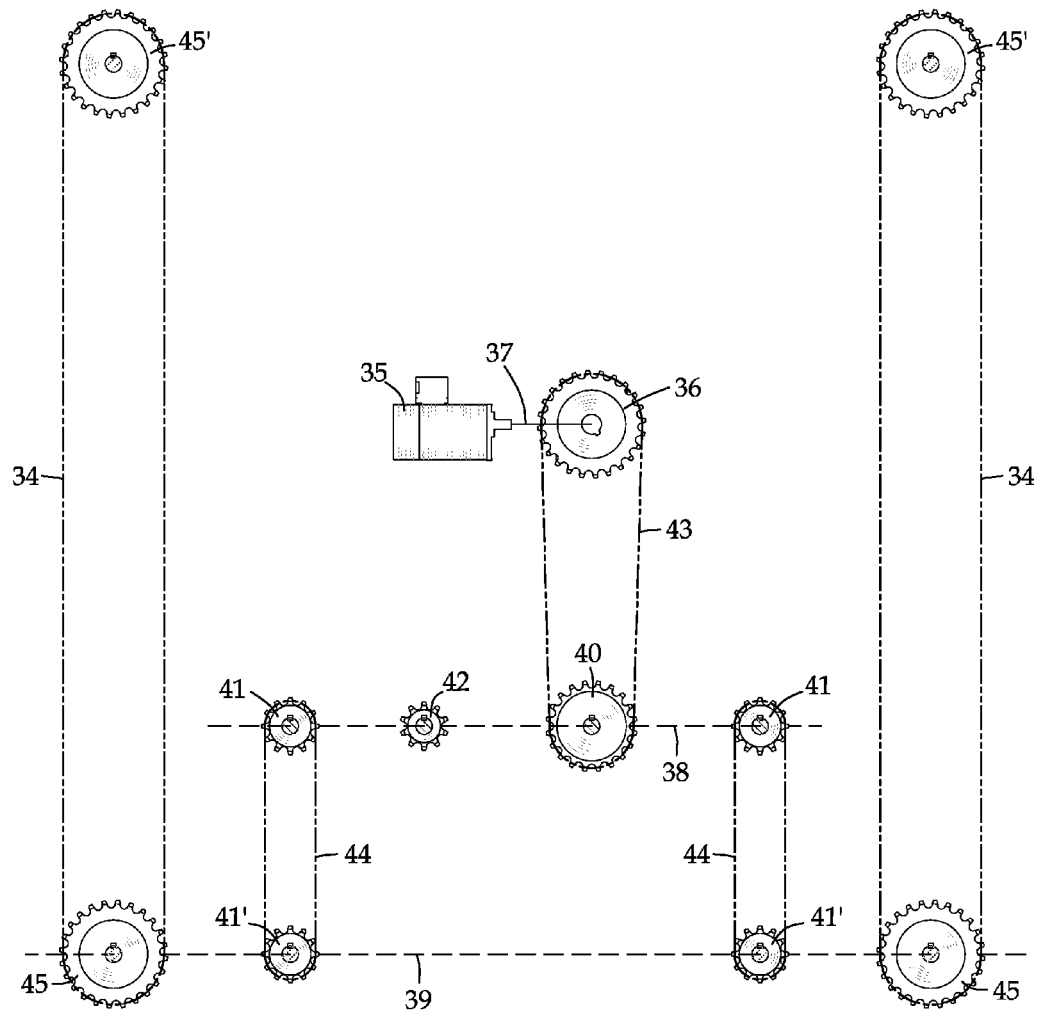
FIG. 4 depicts a gear schematic of the shelf carousel of FIG. 1.
Figure 5:
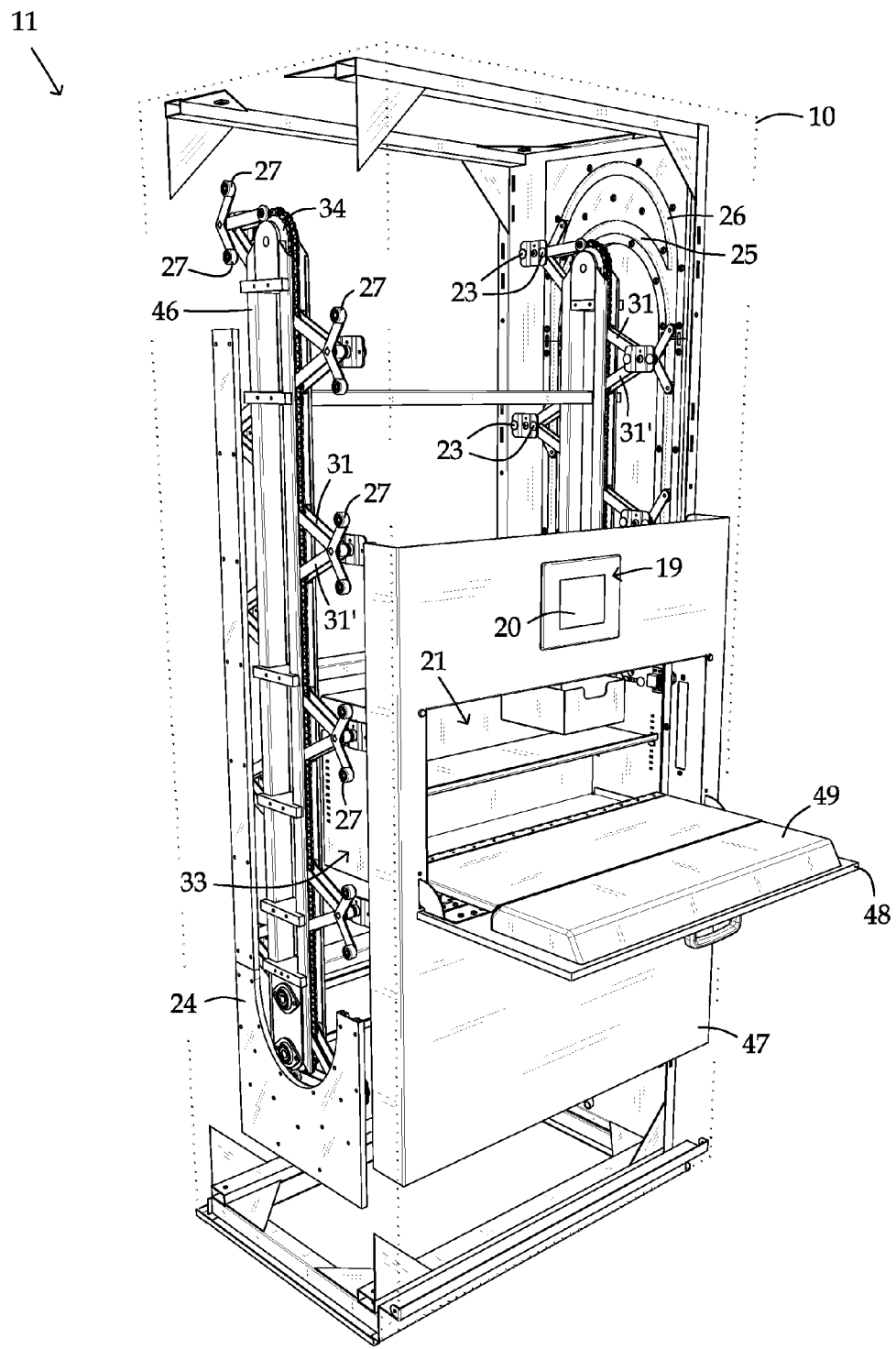
FIG. 5 pictures a front perspective view of the carousel of FIG. 1 with the storage unit removed.

A plurality of shelf chassis 28 are positioned in close proximity about the inner circumference of each support track 22 and each chassis 28 defines chassis leading arm 29, chassis trailing arm 30, and chassis linking arms 31, 31' respectively affixed to chassis body 32. Shelf chassis 28 are the pivotable attachment points linking shelf units 33 (FIGS. 6 and 7) to continuous roller chains 34 such as seen in FIG. 5. Chassis linking arms 31, 31' are rotatably affixed at opposing ends to continuous chain 34 (FIGS. 4 and 5) and chassis body 32 and are pivotably and securely held in place with adjustable mechanical fasteners (not shown). Both chassis leading arm 29 and chassis trailing arm 30 are pivotably affixed to chassis body 32 via adjustable mechanical fasteners (not shown) and are oriented such that leading and trailing arms 29 and 30 are positioned more laterally proximal support track 22 while linking arms 31, 31' are positioned more laterally distal as seen in FIG. 3. Preferred linking arms 31, 31' define a length that is significantly greater than that of either leading arm 29 or trailing arm 30 (for example, each linking arm 31, 31' may be at least twice as long as either leading arm 29 or trailing arm 30). The pivotable attachment of the arms and this sizing ensures that shelf unit 33 and shelf chassis 28 will simultaneously pivot smoothly together during movement throughout the arch of inner channel 25 and outer channel 26, respectively. The preferred embodiment of shelf chassis 28 includes chassis leading arm 29 and trailing arm 30 that are integrally formed into a single, generally V-shaped member as seen in FIG. 5. As understood during movement about continuous chain 34, leading arm 29 upon approaching and entering outer channel 26 is pushed outwardly by the length of arms 31, 31' causing rotation of the integral piece whereby trailing arm 30 is pivoted inwardly to travel inner channel 25. Such rotation permits leading and trailing arms 29, 30 to extend outwardly during movement along the front most longitudinal channel of track 22 and fully rotate one hundred eighty degrees (180°)

to extend inwardly during movement along the rear of track 22 as seen in FIG. 3. Each terminal end of chassis leading arm 29 and trailing arm 30 includes an attachment axle for cam wheels 27. When properly mounted within support track 22, cam wheels 27 and the rotation of leading and trailing arms 29, 30 during travel permit shelf chassis 28 to move circumferentially about support track 22 when circularly driven by continuous chain 34 while supporting shelf unit 33 in a generally stable, horizontal position (i.e. parallel to the horizon) at all times. As previously mentioned, ten (10) shelf chassis 28 are illustrated in the preferred embodiment of shelf carousel system 11 but alternate embodiments may include more or less chassis 28 as desired by the user and the particular environmental or operational requirements. It would be understood that shelf chassis 28 and its various components would be formed from a structurally durable, relatively lightweight material such as a robust polymer or high-grade metal.

Continuous roller chain 34 is in mechanical communication with a series of sprockets that transfer the movement energy produced by motor 35 (illustrated schematically in FIG. 4 without a power supply) to the plurality of shelf chassis 28 supporting shelf units 33. Roller chain 34 forms a longitudinally oriented loop that is preferably positioned in a laterally offset position (i.e. not on the lateral center of storage unit 10) to ensure proper spacing and mechanical action of shelf carousel system 11 components (see FIG. 3). FIG. 4 displays the preferred sprocket schematic which, when properly installed and powered, is optimally designed and timed for preferred shelf carousel system 11. Motor sprocket 36 preferably includes twenty-four (24) teeth arranged circumferentially and is in rotational communication with motor 35 via transverse motor axle 37. Lower axle 39, upper axle 38, and motor axle 37 are all represented schematically in FIG. 4, as it would be understood that certain axle characteristics may be variable depending on the size and operating environment of shelf carousel system 11. Motor sprocket 36 is in rotational communication with primary transfer sprocket 40 through a conveyance device such as chain 43, although other conveyance mechanisms are also contemplated. Primary transfer sprocket 40 preferably includes twenty (20) teeth arranged circumferentially and is in rotational communication with a first pair of secondary transfer sockets 41 positioned at opposing ends of upper axle 38. Preferred shelf carousel system 11 includes index socket 42, a ten (10) tooth socket positioned on upper axle 38 between primary transfer socket 40 and one of secondary sockets 41 and in rotational communication therewith. The described positioning and orientation of index socket 42 creates the preferred rotational transference and timing not found in the prior art, specifically for bidirectional operation of shelf carousel system 11. The first pair of secondary transfer sockets 41 are in rotational communication via a conveyance device such as chains 44 with different ones of a second pair of secondary transfer sockets 41' positioned on and in communication with lower axle 39. Secondary transfer sockets 41, 41' each preferably include twelve (12) teeth arranged circumferentially around the respective socket. Each of secondary transfer sockets 41' are in rotational communication with different ones of a first pair of conveyor sockets 45 positioned distally the respective transfer sockets 41' on lower axle 39. The first pair of conveyor sockets 45 are in rotational communication with different ones of a second pair of conveyor sockets 45' via a conveyance device such as roller chains 34. Conveyor sockets 45, 45' each preferably include twenty-four (24) teeth arranged circumferentially around the respective socket. While the specific tooth counts for the various sprockets 36, 40, 41, 42, and 45 have been disclosed, this information is not intended to be construed as limiting on the instant invention, as other sprockets may be capable of performing as those described herein. However, the manner in which these sprockets are oriented, with motor sprocket 36 and primary transfer sprocket 40 positioned generally on a midline (not shown), and index socket 42 positioned more distal, and secondary transfer sprockets 41, 41' positioned more distal, and conveyor sprockets 45, 45' positioned more distal still, should not be considered arbitrary, and is believed to be a factor in the improvement of shelf carousel system 11 over the prior art, as well as assisting shelf unit 33 to clear U-shaped polymeric chain guard 46 (FIG. 5).

Figure 6:
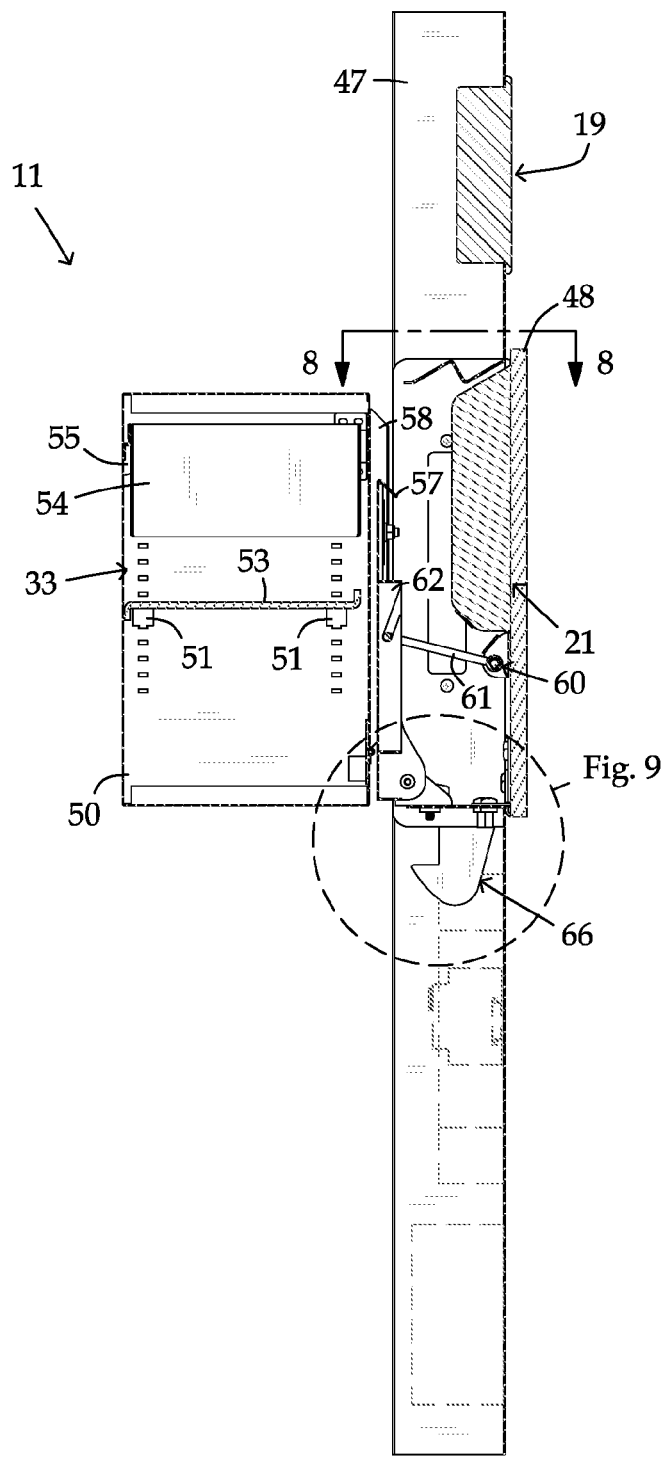
FIG. 6 features an elevated side cross-sectional view of the shelf carousel of FIG. 2 with the door in a closed position.
Figure 8:
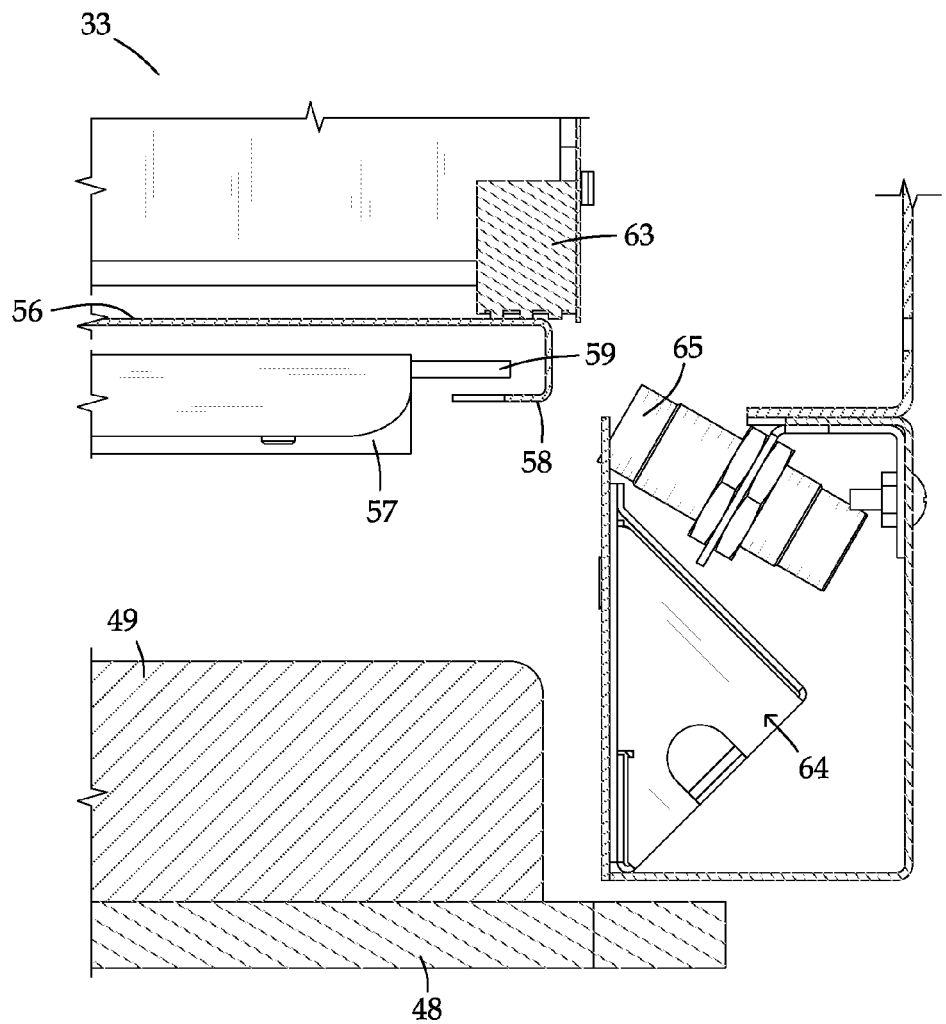
FIG. 8 illustrates a top plan cross-sectional view of the shelf carousel of FIG. 6 along lines 8-8.

As represented in FIGS. 5 and 6, preferred shelf carousel system 11 includes at least one door module 21 capable for transitioning of shelf door 56, catch door 57, and exterior door 48 simultaneously from a first, open position to a second, closed position, usually with manual input from a user. FIG. 5 demonstrates a side perspective view of shelf carousel 11 with storage system 10 and one support track 22 removed and a portion of internal cladding 24 cut away with only one shelf unit 33 affixed to opposing shelf chassis 28. Door housing 47 is an internal reinforcement positioned within storage unit 10 that serves as the interface between shelf unit 33 and exterior cabinet door 48 which provides a mounting substrate for arm pad 49, particularly beneficial when users attempt to remove large or heavy items from the interior of shelf unit 33. As shown more clearly in FIG. 6, shelf unit 33 includes a generally rectangular container 50 that is propelled around support tracks 22 with the aid of opposingly oriented shelf chassis 28, each of which include dowels 23 (FIGS. 5 and 6) mounted to a respective mounting bracket and configured for rotatable engagement with shelf unit 33. Container 50 also includes shelf door 56 hingedly affixed thereto and having engagement channel 58 along the outer side edges thereof as seen in FIG. 8. While only one side is shown in FIG. 8, it is understood that both sides of shelf unit 33 with shelf door 56 are mirror images. Shelf door 56 closes off the front of shelf unit 33 and securely maintains any goods stored within container 50. The interior of container 50 includes a plurality of adjustable tabs 51 that engage within a series of apertures 52 to carry one or more shelf platforms 53 (only one shown for clarity). Container 50 may also include enclosure 54 for storage of separate items. Enclosure 54 may be fixed to an interior surface of container 50, but preferably is slidably attached to rear rail 55 so that enclosure 54 can be laterally repositioned as desired. It should be understood that embodiments of container 50 and enclosure 54 may define various shapes and be formed from numerous materials and still be within the scope of the instant disclosure.

Figure 7:
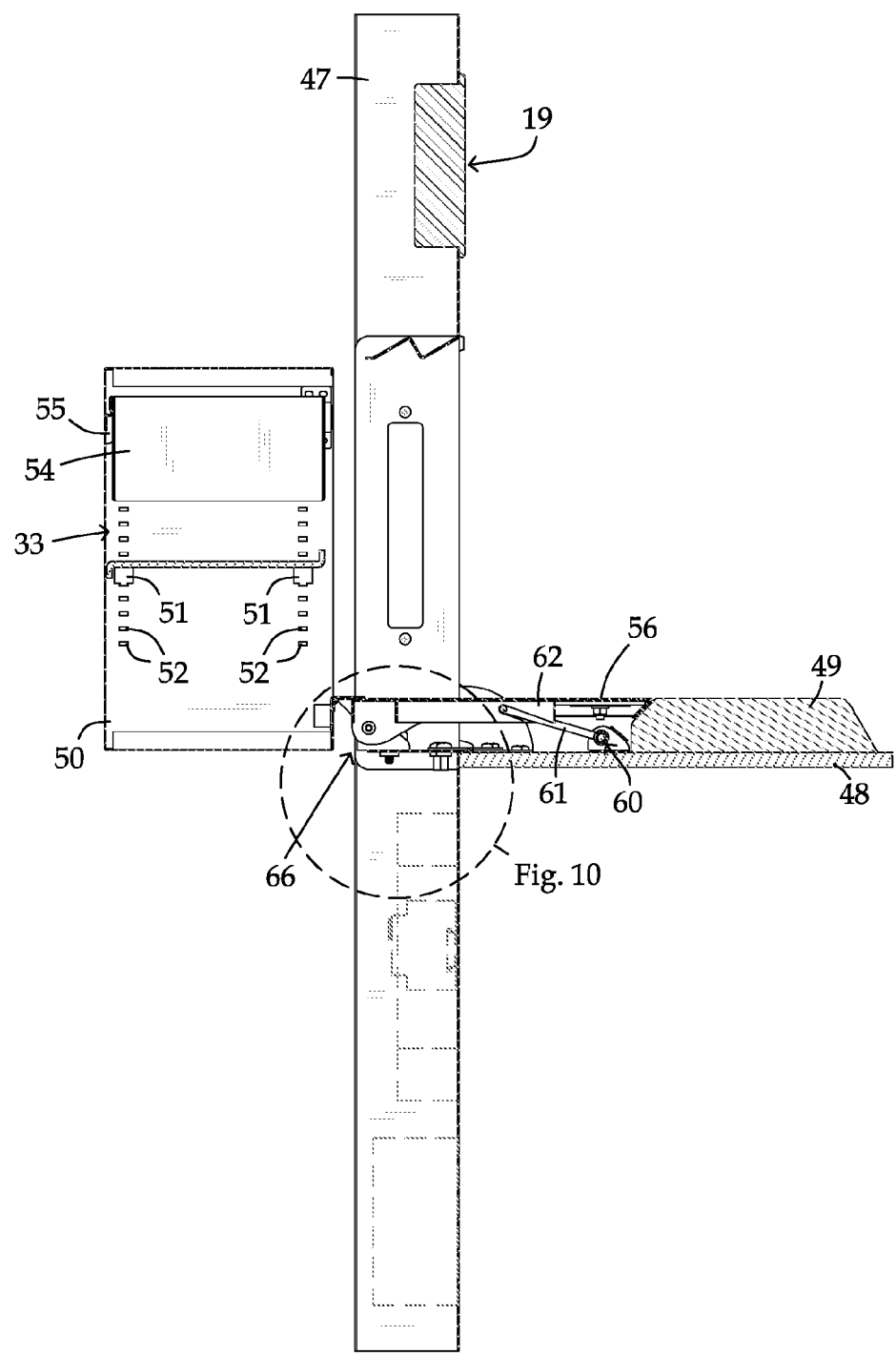
FIG. 7 shows an elevated side cross-sectional view of the shelf carousel of FIG. 2 along lines 7-7.

When shelf unit 33 is called into alignment with door module 21 by the user via control display 19 as shown in FIG. 6, 7 or 8, shelf door 56 is positioned around and proximate to catch door 57 which is hingedly affixed to door housing 47. Specifically, a pair of J-shaped engagement channels 58 opposingly positioned and laterally inwardly-facing on the exterior, storage unit-facing surface vertically displace (either upwardly or downwardly depending on the direction of rotation) about different ones of a pair of catch door projections 59 of catch door 57. FIG. 8 depicts a downward facing, top plan cross-sectional view of the shelf carousel of FIG. 6 along lines 8-8 and therefore only illustrates one side of the engagement described above, although it should be understood that the figure and resulting description inherently apply to both sides of shelf unit 33 and storage unit 10. J-shaped engagement channel 58 extends the substantial majority of the exterior, storage unit-facing surface of shelf unit 33, preferably tapering on either end to encourage efficient engagement and disengagement with catch door projections 59. Coupled with shelf door 56, the "hook" of engagement channel 58 serves to surround projection 59 on three sides. As represented in FIG. 8, projection 59 protrudes laterally outward from a shelf unit-facing surface, and in a preferred embodiment is formed from a rigid, lightweight material such as nylon or some similar polymer. Once shelf unit 33 is positioned in the alignment represented in FIG. 6, a user may manually engage outer door 48, for example by a handle (not shown) and J-shaped engagement channels 58 are frictionally contacted by projections 59, causing shelf door 56 and catch door 57 to pivot outwardly, opening shelf unit 33 to the user as shown in FIG. 7. To facilitate this opening, linkage 60 may also exert opening force. Formed from L-shaped linking rod 61 pivotally mounted to exterior door 48 and slideably positioned within angularly slotted member 62 joined to door housing 47, linkage 60 preferably serves as the transference mechanism to communicate the physical input from exterior door 48 to catch door 57. During the transition from closed to open positions, linking rod 61 slides within slotted member 62 causing outward pivoting of slotted member 62 and catch door 57. As catch door 57 abuts and exerts outward force upon engagement channels 58, shelf door 56 then pivots outwardly whereby the components positioning and angle of movement allows shelf door 56 to slide overtop aligning with catch door 57 to abut arm pad 49 as seen in FIG. 7 and provide a smooth planar top surface for retrieval or returning of goods maintained within shelf unit 33. As further represented in FIG. 8, embodiments of shelf carousel system 11 may include accessories for enhancing the function and safety of the system. For example, some embodiments may include magnets 63 positioned on opposing exterior surfaces of shelf unit 33 to further stabilize and maintain shelf door 56 against shelf unit 33, which may be useful when loading or unloading particularly large or heavy items. Other embodiments may include one or more light sources 64 for illuminating the interior of shelf unit 33 upon engagement by a user. As would be understood, light source 64 may be configured to come on when exterior door 48 is opened, but may turn off to conserve energy and reduce heat when exterior door 48 is closed. Still other embodiments may include one or more proximity sensors 65. Affixed in close proximity to catch door 57, sensors 65 are in electronic communication with control display 19 and electronically report the status of shelf door 56 as it relates to catch door 57. In one embodiment, control display 19 may be configured such that shelf carousel 11 will not rotate until a reading is confirmed from sensor 65 of secure closure, thus preventing inadvertent rotation and potential user harm.

Figure 9:
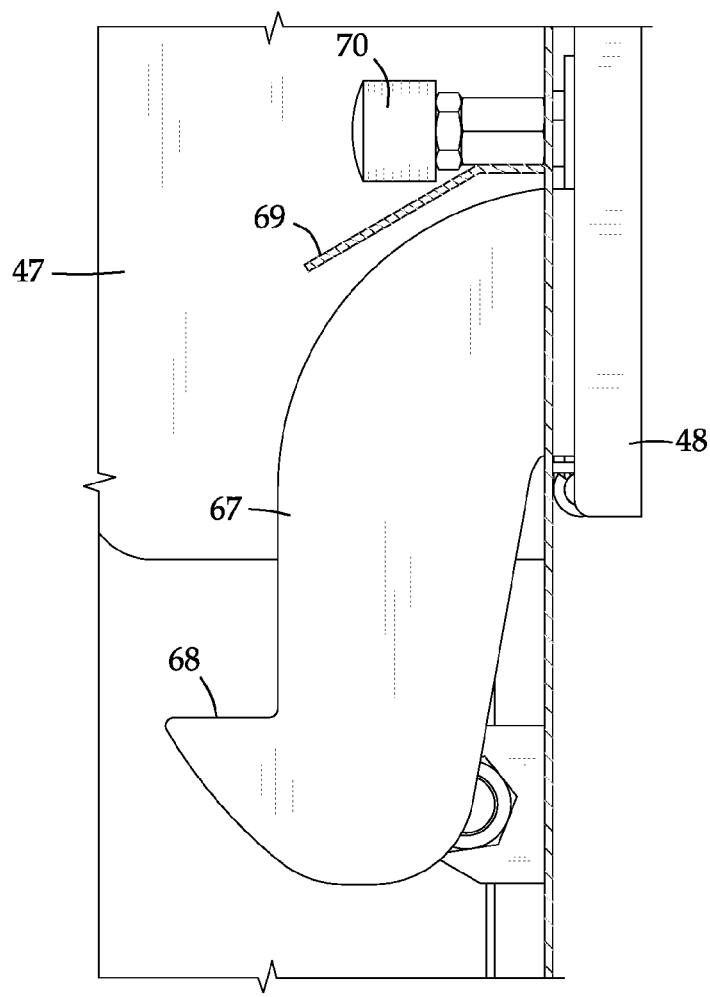
FIG. 9 is a detailed view taken from the dashed circle shown in FIG. 6 and depicting an enlarged elevated end of the shelf carousel.
Figure 10:
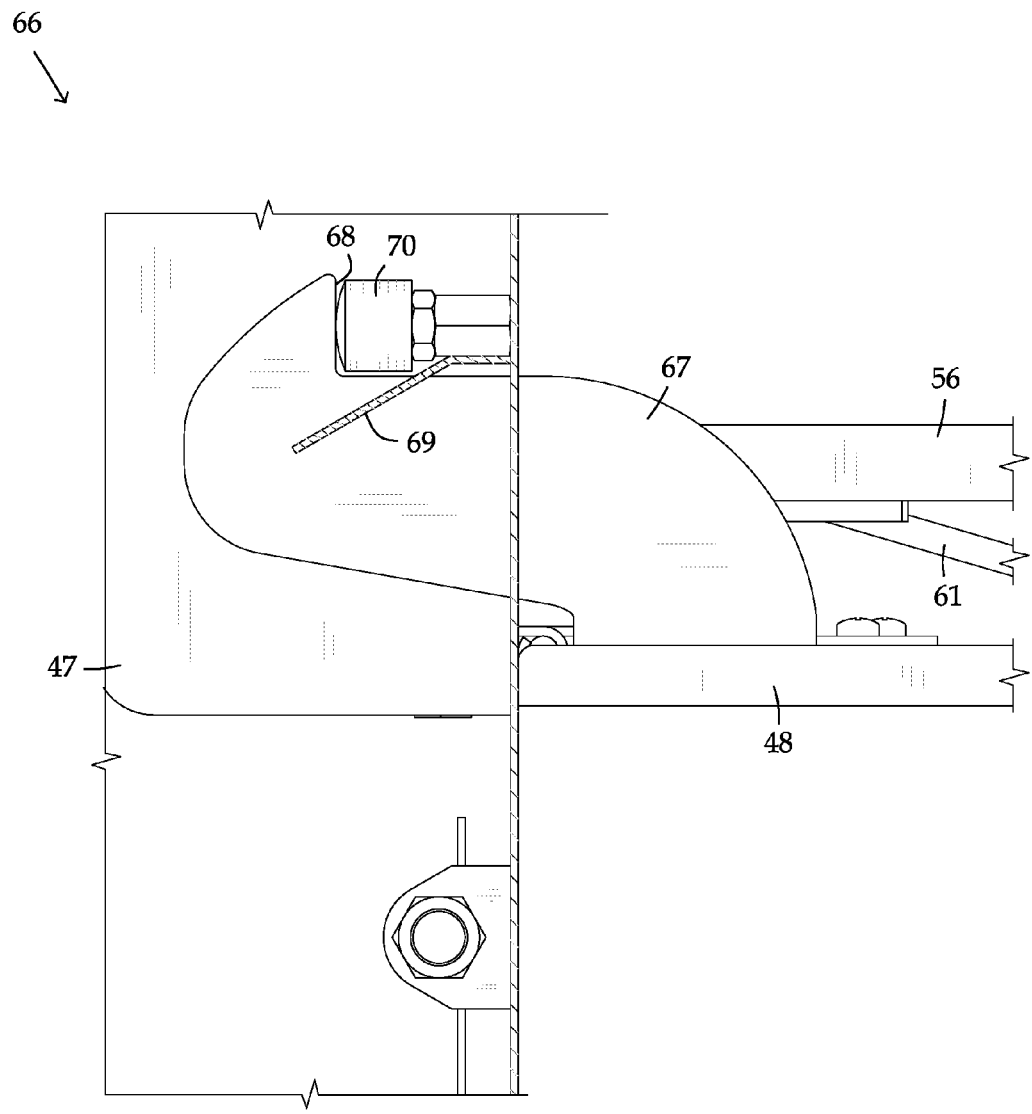
FIG. 10 is a detailed view taken from the dashed circle shown in FIG. 7 and depicting an enlarged elevated end of the shelf carousel.

FIGS. 6 and 7 also demonstrates exterior hinge assembly 66 mechanically and rotatably attached to a lower portion of catch door 57, shown enlarged as closed in FIG. 9 such as seen in field 9 of FIG. 6 and pivoted open in FIG. 10 such as seen in field 10 in FIG. 7. As above, these views represent cross-sectional illustrations so it is to be understood that the following description applies equally to the assembly 66 on the opposing side. Hinge assembly 66 is formed from hinge member 67 defining stop plate 68 and positioned within a slot defined by door housing 47. Guide plate 69 and adjustable bumper 70 are perpendicularly mounted to the interior surface of housing 47, bumper 70 jutting out perpendicularly while guide plate 69 angles downwardly. The length of guide plate 69 corresponds generally to the size of adjustable bumper 70, such that when exterior door 48 is opened, stop plate 68 contacts bumper 70 to prevent over-opening of exterior door 48 (see FIG. 10). Guide plate 69 ensures that the proper contact between stop plate 68 and bumper 70 takes place, and the distance between the bumper contact surface and exterior door 48 is threadably adjustable, meaning that the user may adjust the opening angle of exterior door 48 as might be suitable.

An alternate embodiment of the rotating shelf carousel disclosed herein preferably includes eight shelf units and further includes a compressor positioned in the storage unit. With the addition of flexible sealing strips along the door openings as would be understood, the entire interior storage compartment of the storage unit may be cooled and items which must otherwise be refrigerated may be stored therein.

The illustrations and examples provided herein are for explanatory purposes and are not intended to limit the scope of the appended claims.

I claim:

1. A rotating carousel shelf system comprising:
    a support track bifurcating into inner and outer routes at opposing longitudinal ends and positioned within a storage unit,
    a plurality of shelf chassis each defining a leading arm, a trailing arm, and at least one linking arm, the leading and trailing arms each attached to wheels positioned within the support track,
    a plurality of sprockets mounted to the storage unit and in rotational communication via a continuous chain, the at least one linking arm pivotably attached to the chain, and
    a plurality of shelf units pivotably affixed to different ones of the shelf chassis, such that each shelf unit maintains a generally horizontal position regardless of the shelf position on the support track, and a door housing with a catch door positioned within the storage unit, the catch door configured to engage one of the plurality of shelf units.

2. The rotating carousel shelf system of claim 1 whereby the plurality of sprockets comprise:
    a motor sprocket in communication to a primary transfer socket via a first chain,
    a first pair of secondary transfer sockets in communication with the primary transfer socket via an upper axle,
    a second pair of secondary transfer sockets in communication with the first pair of secondary transfer sockets via a second chain,
    a first pair of conveyor sockets in communication with the second pair of secondary transfer sockets via a lower axle, and
    a second pair of conveyor sockets in communication with the first pair of conveyor sockets via the continuous chain.

3. The rotating carousel shelf system of claim 2 further comprising an index socket positioned on the upper axle and in communication with the primary transfer socket and one of the first pair of secondary transfer sockets.

4. The rotating carousel shelf system of claim 2 further comprising a motor, the motor socket in communication with the motor via a motor axle.

5. The rotating carousel shelf system of claim 1 further comprising a chain guard.

6. The rotating carousel shelf system of claim 1 further comprising a control display with a screen.

7. The rotating carousel shelf system of claim 1 further comprising internal cladding.

8. The rotating carousel shelf system of claim 1 whereby each of the plurality of shelf units defines a J-shaped engagement channel.

9. The rotating carousel shelf system of claim 8 whereby the catch door defines a projection.

10. The rotating carousel shelf system of claim 1 further comprising a linkage formed by a linking rod rotatably mounted to an exterior door and a slotted member connected to the catch door.

11. A rotating carousel shelf system comprising:
- a support track bifurcating into inner and outer routes at opposing longitudinal ends and positioned within a storage unit defining an exterior door,
- ten shelf chassis each defining a leading arm, a trailing arm, and a pair of linking arms, the leading and trailing arms each attached to wheels positioned within the support track,
- a plurality of sprockets mounted to the storage unit and in rotational communication via a continuous chain, the pair of linking arms each pivotably attached to the chain, and
- ten shelf units pivotably affixed to different ones of the shelf chassis, such that each shelf unit maintains a generally horizontal position regardless of the shelf position on the support track, and a door housing with a catch door positioned within the storage unit, the catch door configured to engage one of the plurality of shelf units.

12. The rotating carousel shelf system of claim 11 whereby the plurality of sprockets comprise:
- a motor in communication with a motor socket via a motor axle,
- a primary transfer socket in communication with the motor sprocket via a first chain,
- a first pair of secondary transfer sockets and an index socket in communication with the primary transfer socket via an upper axle,
- a second pair of secondary transfer sockets in communication with the first pair of secondary transfer sockets via a second chain,
- a first pair of conveyor sockets in communication with the second pair of secondary transfer sockets via a lower axle, and
- a second pair of conveyor sockets in communication with the first pair of conveyor sockets via the continuous chain.

13. The rotating carousel shelf system of claim 12 further comprising a control display with a screen in electronic communication with the motor.

14. The rotating carousel shelf system of claim 11 whereby each of the shelf units defines a pair of opposingly positioned and longitudinally oriented J-shaped engagement channels.

15. The rotating carousel shelf system of claim 14 whereby the catch door defines a pair of opposingly oriented and laterally extending projections.

16. The rotating carousel shelf system of claim 15 further comprising a linkage formed by a linking rod rotatably mounted to the exterior door and a slotted member connected to the catch door.

17. The rotating carousel shelf system of claim 16 further comprising a hinge assembly pivotably mounted to the door housing with a hinge member defining a stop plate.

18. The rotating carousel shelf system of claim 17 further comprising an adjustable bumper, the stop plate defining the same general size as the bumper such that when the exterior door is opened, the stop plate contacts the bumper.

19. A rotating carousel shelf system with a support track within a storage unit, the shelf system comprising:
- a plurality of shelf chassis each defining a leading arm, a trailing arm, and at least one linking arm, the leading and trailing arms each attached to wheels positioned within the support track,
- a plurality of sprockets mounted to the storage unit and in rotational communication via a continuous chain, the at least one linking arm pivotably attached to the chain, and
- a plurality of shelf units pivotably affixed to different ones of the shelf chassis, such that each shelf unit maintains a generally horizontal position regardless of the shelf position on the support track and a door housing with a catch door positioned within the storage unit, the catch door configured to engage one of the plurality of shelf units.

20. The rotating carousel shelf system of claim 19 whereby the plurality of sprockets comprise:
- a motor sprocket in communication to a primary transfer socket via a first chain,
- a first pair of secondary transfer sockets in communication with the primary transfer socket via an upper axle,
- a second pair of secondary transfer sockets in communication with the first pair of secondary transfer sockets via a second chain,
- a first pair of conveyor sockets in communication with the second pair of secondary transfer sockets via a lower axle, and
- a second pair of conveyor sockets in communication with the first pair of conveyor sockets via the continuous chain.

* * * * *